US010723016B2

(12) United States Patent
Cho et al.

(10) Patent No.: US 10,723,016 B2
(45) Date of Patent: Jul. 28, 2020

(54) WEARABLE HAND ROBOT

(71) Applicant: NATIONAL REHABILITATION CENTER, Seoul (KR)

(72) Inventors: Kyu-Jin Cho, Seoul (KR); Hoyoung Ban, Yongin-si (KR); Brian Byunghyun Kang, Seoul (KR); Hyunki In, Bucheon-si (KR); Haemin Lee, Seoul (KR); Jinwon Chung, Seoul (KR); Ki Hun Cho, Seoul (KR)

(73) Assignee: NATIONAL REHABILITATION CENTER, Seoul (KR)

( * ) Notice: Subject to any disclaimer, the term of this patent is extended or adjusted under 35 U.S.C. 154(b) by 330 days.

(21) Appl. No.: 15/775,764

(22) PCT Filed: Nov. 10, 2016

(86) PCT No.: PCT/KR2016/012883
§ 371 (c)(1),
(2) Date: May 11, 2018

(87) PCT Pub. No.: WO2017/082635
PCT Pub. Date: May 18, 2017

(65) Prior Publication Data
US 2018/0345481 A1 Dec. 6, 2018

(30) Foreign Application Priority Data
Nov. 13, 2015 (KR) .................. 10-2015-0159288

(51) Int. Cl.
*G11B 17/12* (2006.01)
*B25J 9/00* (2006.01)
*B25J 9/10* (2006.01)
*B25J 9/16* (2006.01)

(52) U.S. Cl.
CPC ............. *B25J 9/0006* (2013.01); *B25J 9/104* (2013.01); *B25J 9/1664* (2013.01)

(58) Field of Classification Search
CPC ........ B25J 9/0006; B25J 9/104; B25J 9/1664; G11B 15/6835; G11B 17/02
See application file for complete search history.

(56) References Cited

U.S. PATENT DOCUMENTS 6,301,526 B1* 10/2001 Kim ...................... B25J 9/0006
                                                    600/1
6,741,911 B2* 5/2004 Simmons ............... B25J 9/0006
                                                    318/568.11
(Continued)

FOREIGN PATENT DOCUMENTS

| JP | 5211058 B2 | 6/2013 |
| KR | 20-0372122 Y1 | 1/2005 |
| KR | 10-0558023 B1 | 3/2006 |
| KR | 10-1263933 B1 | 5/2013 |
| KR | 10-1543617 B1 | 8/2015 |

OTHER PUBLICATIONS

In et al., Exo-Glove: A Wearable Robot for the Hand with a Soft Tendon Routing System, 2015, IEEE, p. 97-105 (Year: 2015).*
(Continued)

*Primary Examiner* — McDieunel Marc
(74) *Attorney, Agent, or Firm* — Rabin & Berdo, P.C.

(57) ABSTRACT

A wearable hand robot of the present invention is a wearable hand robot which is mounted on a user's fingers and can bend the user's fingers by means of an external force transmitted through a wire, and comprises: at least one first wire which is disposed to extend toward the tip of a finger and then change the extension direction toward the base of the finger; a finger cap which is configured to be fit on the tip of the finger and includes a first wire tube which is disposed at the end of the finger so that the first wire passes therethrough and is U-shaped; a finger member comprising two second wire tubes, at least one finger strap and at least one bending unit; and a support member which is mounted on the hand adjacent to the user's wrist and through which the first wire extending from the finger member passes. The (Continued)

two second wire tubes are configured to extend in the extension direction of the finger segment and are disposed on the respective sides of the finger, and the first wire passes therethrough. The at least one finger strap is coupled to the second wire tubes and is disposed on the finger segment. The at least one bending unit is disposed on the joint so as to bendably connect finger straps which are adjacent to each other or to bendably connect the finger cap and the finger strap which are adjacent to each other.

5 Claims, 4 Drawing Sheets

(56) References Cited

U.S. PATENT DOCUMENTS

| | | | |
|---|---|---|---|
| 7,353,082 B2* | 4/2008 | Pretlove | B25J 9/1664 318/568.2 |
| 8,029,414 B2 | 10/2011 | Ingvast et al. | |
| 2015/0190246 A1 | 7/2015 | Ryu et al. | |

OTHER PUBLICATIONS

Muramatsu et al., Efficiency of gripping mechanism using buckling phenomenon of long column, 2009, IEEE, p. 1474—(Year: 2009).*
In et al., Investigation of Friction Characteristics of a Tendon Driven Wearable Robotic Hand, 2010, IEEE, p. 568-573 (Year: 2010).*
Kang et al., Modeling of tendon driven soft wearable robot for the finger, 2013, IEEE, 459-460 (Year: 2013).*

* cited by examiner

WEARABLE HAND ROBOT

BACKGROUND

Technical Field

The present disclosure relates to a wearable hand robot, and more particularly, to a wearable hand robot of a simplified structure, which is put on a user's hand like a glove and moves a user's finger with its exoskeleton structure, thus improving user convenience.

Description of the Related Art

Many forms of wearable robots have been developed to help people who are unable to move part of their body with their own remaining skeleton due to neurological disorders such as paralysis, or the like.

In particular, the wearable hand robots have been developed for wearing on hands like gloves to help those who are incapable of moving their fingers.

Conventionally, the glove-type wearable robot generally has an actuator provided for each joints of each fingers for moving the joints with an exoskeleton structure, and a sensor for sensing a displacement or an angle of a movement of the joints. As the actuator or the sensor is installed on each moving part of the fingers, the wearable hand robot has an increased volume as well as increased weight. Complicated structure thereof also poses a problem of increased manufacturing cost. In addition, due to the complicated structure and large volume, it is inconvenient to wear and use the wearable hand robot.

In addition, since the conventional wearable hand robot is formed of a fiber material, when the wire is pulled, there is a problem that the wire passing through the fingers penetrates into the skin of the hand, causing pain.

In addition, since the conventional wearable hand robot is formed of a fiber material, there is a problem that it is easily contaminated by sweat of the user, dirt, or the like, thus necessitating frequent washing, and the user is not able to use the wearable hand robot until the washed robot is dried.

In addition, since the conventional wearable hand robot needs to be customized to the size of a user's hand or finger, there is a problem that the productivity is decreased and the unit price of the product is increased, lowering the price competitiveness.

DETAILED DESCRIPTION

Technical Problem

The present disclosure has been made to solve the problems mentioned above, and accordingly, it is an objective of the present disclosure to provide a wearable hand robot, which can prevent a user's hand from being scratched by a wire as it is pulled or loosened by an actuator, can be mounted in accordance with the size of a user's hand, and is easy to wash and dry.

Technical Solution

In order to solve the problems described above, a wearable hand robot is provided, which is a wearable hand robot mounted on a user's fingers and can bend the user's fingers by means of an external force transmitted through a wire, and include at least one first wire which is disposed to extend toward the tip of a finger and then change the extension direction toward the base of the finger; a finger cap which is configured to be fit on the tip of the finger and includes a first wire tube which is disposed at the end of the finger so that the first wire passes therethrough and is U-shaped; a finger member comprising two second wire tubes, at least one finger strap and at least one bending unit; and a support member which is mounted on the hand adjacent to the user's wrist and through which the first wire extending from the finger member passes, in which the two second wire tubes are configured to extend in the extension direction of the finger segment and are disposed on the respective sides of the finger, and the first wire passes therethrough, the at least one finger strap is coupled to the second wire tubes and is disposed on the finger segment, and the at least one bending unit is disposed on the joint so as to bendably connect finger straps which are adjacent to each other or to bendably connect the finger cap and the finger strap which are adjacent to each other.

Advantageous Effects

The present disclosure gives the following effects. The wearable hand robot provided to achieve the objectives described above has an effect that it is possible to prevent a first wire and a second wire, which pass through a finger cap, a finger member, and a palm support member, from being pulled by an actuator and pressing on a user's hand and penetrating into the user's skin, or leaving a scratch on the user's hand due to friction.

In addition, since the wearable hand robot according to the present disclosure is formed of a material such as silicone or synthetic resin rather than leather or fiber material, there is an advantageous effect that it is possible to prevent problems such as the user's sweat is absorbed, giving off malodor, or propagation of germs, and so on, and maintenance of the wearable hand robot is also easy since it can be cleaned by washing with water and then used after simply shaking off residual water.

In addition, according to the present disclosure, since a bending unit, which is flexible by the elasticity of the wearable hand robot, can be stretched or contracted to suit the length of the user's finger before being mounted thereon, it is not necessary to produce the finger members in a wide range of sizes in consideration of varying lengths of different users' fingers, and accordingly, there is an advantage that production costs are reduced.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

BEST MODE

Hereinafter, a wearable hand robot according to the present disclosure will be described in detail with reference to the accompanying drawings.

Figure 1:
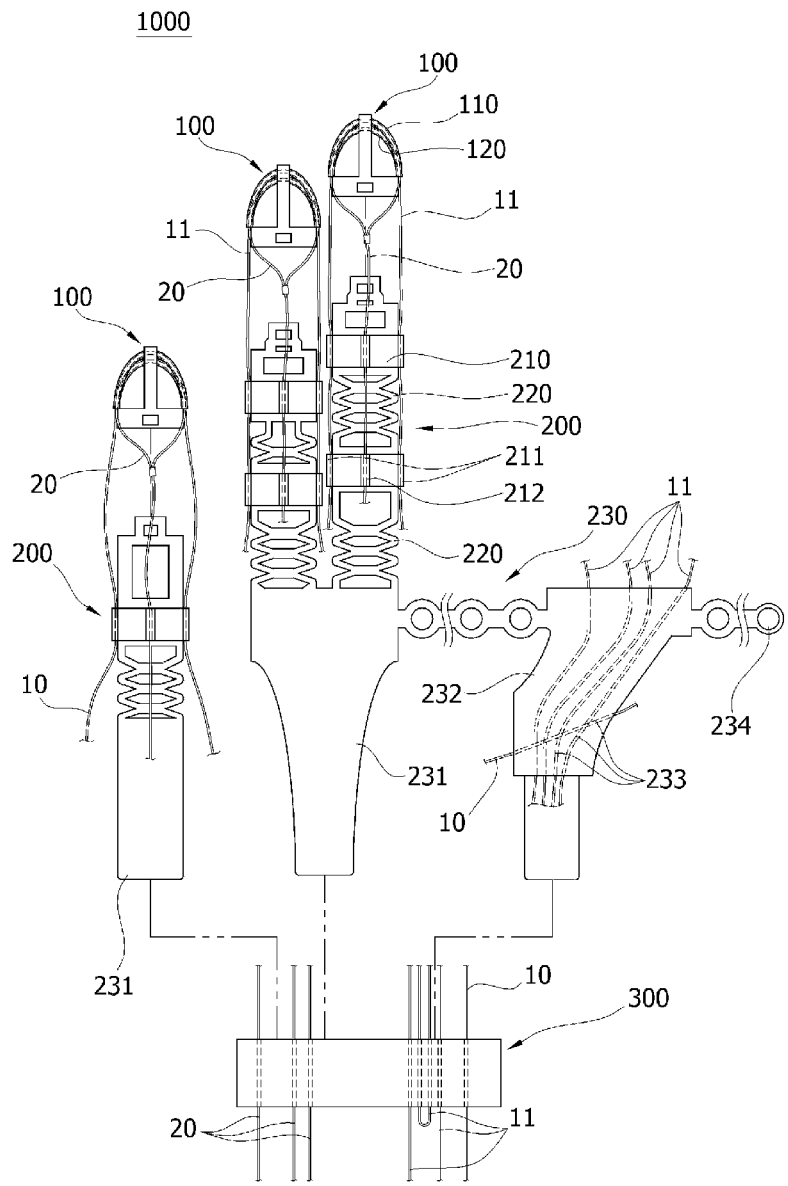
FIG. 1 is an exploded view of a wearable hand robot according to an embodiment of the present disclosure.
Figure 2:
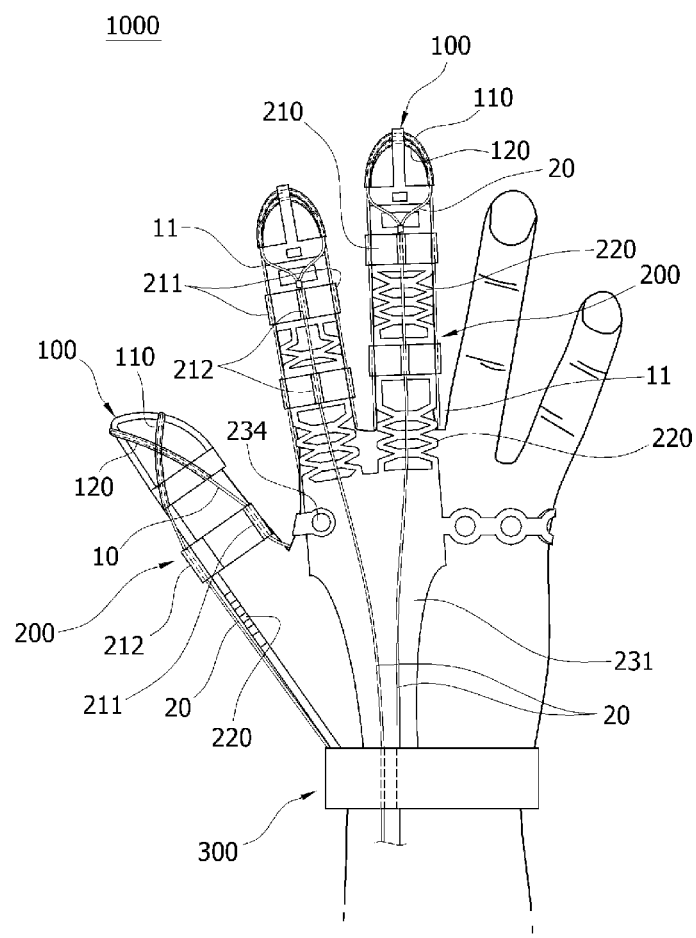
FIG. 2 illustrates a back of hand of the wearable hand robot shown in FIG. 1.
Figure 3:
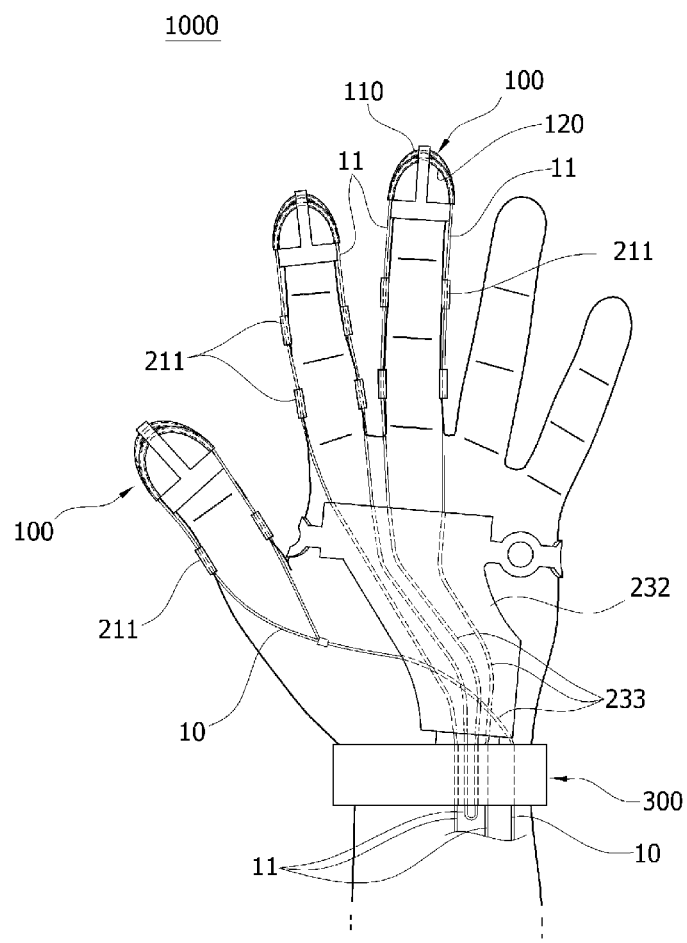
FIG. 3 illustrates a palm of hand of the wearable hand robot shown in FIG. 1.
Figure 4:
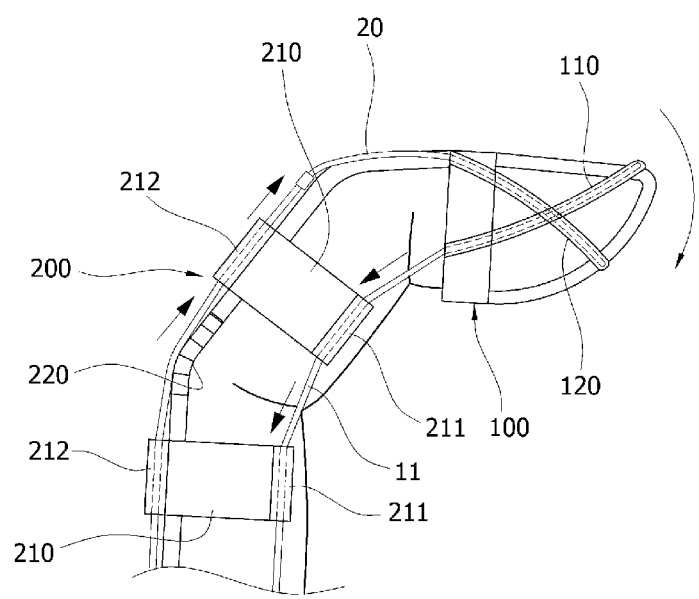
FIG. 4 is a side view of a finger of the wearable hand robot shown in FIG. 1.

FIG. 1 is an exploded view of a wearable hand robot according to an embodiment of the present disclosure, FIG. 2 illustrates a back of hand of the wearable hand robot shown in FIG. 1, and FIG. 3 illustrates a palm of hand of the wearable hand robot shown in FIG. 1.

Referring to the FIGS. 1 to 3, a wearable hand robot 1000 according to an embodiment of the present disclosure includes a finger cap 100 and a finger member 200 and a support member 300, through which a first wire 10, 11 and a second wire 20 pass to bend or unbend a finger of the user by means of an external force transmitted through the first wire 10, 11 and the second wire 20.

The finger cap 100 is disposed on the thumb, index finger and middle finger of the user and fitted on the tip of the finger to surround the tip of the finger. The finger cap 100 is formed of a silicone material. The finger cap 100 includes a first wire tube 110 through which the first wire 10, 11 passes, and a fourth wire tube 120 through which the second wire 20 passes. The first wire tube 110 has a passage formed therein to allow the first wire 10, 11 to pass therethrough. The first wire tube 110 has a U-shaped path along an outer surface of the finger to allow the first wire 10, 11 to extend toward the tip of the finger and then change the extension direction toward the base of the finger. The U-shaped path of the first wire tube 110 is formed to pass a nail portion of the finger. The fourth wire tube 120 has a passage formed therein to allow the second wire 20 to pass therethrough. The fourth wire tube 120 has a U-shaped path that intersects with the U-shaped path of the first wire tube 110. The fourth wire tube 120 allows the second wire 20 to extend toward the tip of the finger and then change the extension direction toward the base of the finger. The U-shaped path of the fourth wire tube 120 is formed so as to pass a fingerprint portion of the finger.

The finger member 200 is mounted on the thumb, index finger and middle finger of the user. The finger member 200 is formed of a silicone material. The finger member 200 engages with the finger cap 100. The finger member 200 includes a finger strap 210 and a bending unit 220. The finger strap 210 is disposed on the finger segment and is mounted to wrap around at least a portion of the finger. The finger strap 210 is mounted to the other finger segments except the finger segment on which the finger cap 100 is fitted. The finger strap 210 includes second wire tubes 211 and a fifth wire tube 212. The second wire tube 211 may be configured as a pair and disposed on both sides of the finger strap 210. The second wire tube 211 extends in the extension direction of the finger segment to allow the first wire 10, 11 to pass therethrough. The fifth wire tube 212 is formed on the back of the finger. The second wire tube 212 extends in the extension direction of the finger segment to allow the second wire 20 to pass therethrough.

The bending unit 220 is disposed on the joint of the finger. The bending unit 220 bendably connects the finger straps 210 adjacent to each other, or bendably connects the finger caps 100 and the finger straps 210 adjacent to each other. The bending unit 220 may be composed of circular rings continuously connected with one another. The bending unit 220 is flexibly formed such that the interval between the finger straps 210 adjacent to each other may be adjusted in accordance with the finger length of the user, or the interval between the finger caps 100 and the finger straps 210 adjacent to each other may be adjusted.

Referring to FIG. 1, a palm support member 230 connects the support member 300 with the finger member 200. The palm support member 230 is formed of a silicone material. One, or a plurality of finger members 200 are connected to the palm support member 230. Specifically, the back-hand support 231, the palm support 232 and the buckle part 234 are formed in the palm support member 230 that is connected to the finger member 200 mounted on the index finger and the middle finger. The back-hand support 231 is formed on the palm support member 230 that is connected to the finger member 200 mounted on the thumb.

The back-hand support 231 is disposed on the back of the user's hand so as to support the back of the user's hand. The finger member 200 for mounting on the index finger and middle finger, or a finger member 200 for mounting on the thumb is connected to the back-hand support 231. The palm support 232 is connected to the back-hand support 231. The palm support 232 supports the palm of the user. At least one third wire tube 233 is formed on the palm support 232 and the first wire 10, 11 passes therethrough. The first wire 10, 11, which passes through the thumb, index finger and middle finger, passes through the third wire tube 233. The third wire tube 233 is composed of five passages. The buckle part 234 connects the back-hand support 231 and the palm support 232 to each other for mounting on the user's hand. The length of the buckle part 234 is adjusted in accordance with the size of a user's hand by means of holes formed at a predetermined interval and projections fitted in the holes.

A pair of support members 300 may be provided, which may be engaged with each other to form a ring shape. The support member 300 has a passage formed therein to allow the first wire 10, 11 and the second wire 20 extending from the finger member 200 to pass therethrough. The support member 300 is disposed so as not to interfere with the movement of the user's wrist. The support member 300 is mounted on the hand of a user adjacent to the user's wrist. Specifically, the support member 300 is formed so as to surround a gradually widening area that connects between the wrist and the hand. As a result, the support member 300 prevents the wrist snap and does not restrict the movement of the wrist, when the first wires 10, 11 and the second wires 20 are pulled by the actuator, and is also prevented from separating from the mounting position due to an external force of the first wire 10, 11 and the second wire 20 being pulled.

Two first wires 10, 11 may be provided. One of the first wires (e.g., first wire 10) is installed to pass through, in order, the support member 300, the finger member 200 and the finger cap 100 that are mounted on the thumb, and the finger member 200 and the supporting member 300, and is independently pulled or loosened according to the actuation of an actuator (not shown). The other first wire (e.g., first wire 11) is installed to pass through, in order, the support member 300, the finger member 200 and the finger cap 100 mounted on the index finger, the finger member 200 and the support member 300, the support member 300, the finger member 200 and the finger cap 100 mounted on the middle finger, and the finger member 200 and the support member 300. When the first wire 11 is pulled by an actuator (not shown), the index finger and middle finger are bent in sequence. That is, the first wire 11 causes the index finger and middle finger to flex in sequence with one actuator (not shown). Three second wires 20 may be provided. The second wires 20 are disposed on the thumb, index finger and middle finger, respectively, and passes through, in order, the support member 300, the fourth wire tube 120 of the finger member 200 and the fifth wire tube 212 of the finger cap 100 and is fixed to the second wire 20 in the form of a lasso, as shown in FIG. 1. When pulled by an actuator (not shown), the second wires 20 cause the fingers to extend. The actuator (not shown) loosens the second wire 20 when pulling the first wire 10, 11 and loosens the first wire 10, 11 when pulling the second wire 20.

Hereinafter, the operation of the wearable hand robot 1000 configured as described above according to embodiments of the present disclosure will be described.

Referring to FIGS. 2 and 3, the finger caps 100 are fitted on the thumb, index finger and middle finger of the user. The finger straps 210 are fitted to the rest of the finger segments except the finger segment of the finger on which the finger cap 100 is fitted. At this time, the bending unit 220 is stretched or contracted in accordance with the length of the user's finger and is adjusted suitably for the user's finger. When the back-hand support 231 of the palm support member 230 is disposed on the back of the hand and the palm support 232 is disposed of the palm, the buckle part 234 is used to adjust the lengths of the supports 230, 231 to fit the size of the user's hand and fix the supports 230, 231 in position. A pair of support members 300 may be mounted on the user's wrist. In this example, the first wire 10, 11 and the second wires 20 are in the installed state, passing through respective parts of the wearable hand robot 1000. The process of mounting the wearable hand robot 1000 to the user's hand can be performed in a variable order depending on the user.

With the wearable hand robot 1000 being completely mounted on the user's hand, before the actuation of the actuator, both the first wire 10, 11 and the second wire 20 are in loose state. Accordingly, the user's hand is in an extension state.

In this state, the user moves his/her finger adjacent to an object to grab the same. Next, the actuator (not shown) is actuated, pulling the first wire 10 that is through the finger cap 100 and the finger member 200 mounted on the thumb, and thus causing the thumb to flex toward the object. At the same time, the actuator (not shown) pulls the first wire 11 that is through the finger cap 100 and the finger member 200 mounted on the index finger and middle finger, thus causing the index finger and middle finger to flex toward the object. At this time, since the first wire 11 passes through the index finger and the middle finger in sequence, when the first wire 11 is pulled, the index finger bends first toward the object and then stop when the index finger comes into contact with the object, after which the middle finger flexes toward the object. As the fingers flex by means of the first wire 10, 11, the bending unit 220 is bent together along the joint of the finger and simultaneously extended, thus keeping in contact with the user's fingers. Through the processes described above, the thumb, index finger and middle finger of the user are enabled to grab the object. At this time, the actuator releases the second wire 20 as much as the first wire 10, 11 are pulled such that the second wire 20 does not interfere with the actuation of the first wire 10, 11.

The actuator is then actuated to release the pulled first wire 10, 11, with simultaneously pulling the second wire 20 through which the second wire 20 passes and which is installed through the fourth wire tube 120 of the finger cap 100 mounted on the thumb, index finger and middle finger, respectively and through the fifth wire tube 212 of the finger strap 210, to extend the flexed finger.

As described above, the wearable hand robot 1000 provided according to the embodiments of the present disclosure has an effect that it is possible to prevent the first wire 10, 11 and the second wire 20, which pass through the finger cap 100 and the finger member 200, and the palm support member 230, from being pulled by an actuator and pressing on a user's hand and penetrating into the user's skin, or from leaving a scratch on the user's hand due to friction.

In addition, since the wearable hand robot 1000 is formed of a material such as silicone or synthetic resin rather than leather or fiber material, there is an advantageous effect that it is possible to prevent problems such as the user's sweat is absorbed, giving off malodor, or propagation of germs, and maintenance of the wearable hand robot is also easy since it can be cleaned by washing with water and then used Simply by shaking off residual water.

In addition, since the bending unit, which is elastically flexible, can be stretched or contracted to suit the length of the user's finger before being mounted thereon, it is not necessary to produce the finger members 200 in a wide range of sizes in consideration of varying lengths of different users' fingers, and accordingly, there is an advantage that production costs are reduced.

While the preferred embodiments of the wearable hand robot of the present disclosure have been described above, the scope of the present disclosure is not limited to the structures described and illustrated above.

For example, while it is described herein that the first wire 10 as one of the two first wires 10, 11 passes through the finger members 200 and the finger caps 100 mounted on the thumb, and the other first wire 11 passes through, in order, the finger members 200 and the finger caps 100 mounted on the index finger and middle finger, in another embodiment, the first wire may be composed of three wires and installed to pass through the finger members and the finger caps mounted on the thumb, index finger and middle finger, respectively, in which case the actuator may pull each of the first wires separately to bend the finger on which the first wire is installed.

Alternatively, the first wire may be composed of three wires and installed to pass through the finger members and the finger caps mounted on the thumb, index finger and middle finger, respectively, in which case each of the first wires may be connected together such that the actuator may simultaneously pull the three first wires to cause the thumb, index finger and middle finger to flex simultaneously.

Alternatively, the first wires passing through the thumb may be individually actuated by the actuator, and the first wires passing through the index finger and middle finger may be connected and actuated as one.

In addition, the first wire may be disposed to pass through, in order, the finger members and the finger caps mounted to the thumb, index finger and middle finger, respectively, such that, when the first wire is pulled, the thumb first flexes toward the object until it stops upon contact with the object, after which the index finger and the middle finger flex in sequence toward the object and therefore, can grab the object.

INDUSTRIAL APPLICABILITY

A wearable hand robot of a simplified structure can be put on a user's hand like a glove and move a user's finger with its exoskeleton structure, thus improving user convenience.

What is claimed is:

1. A wearable hand robot mounted on a user's finger and can bend the user's finger by means of an external force transmitted through a wire, comprising:

at least one first wire which is disposed to extend toward the tip of the finger and then change the extension direction toward the base of the finger;

a finger cap which is configured to be fit on the tip of the finger and includes a first wire tube which is disposed at the tip of the finger so that the first wire passes therethrough and is U-shaped;

a finger member comprising two second wire tubes, at least one finger strap and at least one bending unit; and a support member which is mounted on the hand adjacent to the user's wrist and through which the first wire extending from the finger member passes, wherein the two second wire tubes are configured to extend in the extension direction of finger segment and are disposed on the respective sides of the finger, and the first wire passes therethrough, the at least one finger strap is coupled to the second wire tubes and is disposed on the finger segment, and the at least one bending unit is disposed on joint so as to bendably connect finger straps which are adjacent to each other or to bendably connect the finger cap and the finger strap which are adjacent to each other.

2. The wearable hand robot of claim 1, further comprising a palm supporting member having at least one third wire tube through which the first wire passes, and connecting the support member and the finger member mounted on the hand.

3. The wearable hand robot of claim 1, comprising:

a second wire extending toward a tip of the finger and at the tip of the finger, changing an extension direction toward the base of the finger, the second wire being disposed on a path of intersecting with the first wire when changing the extension direction at the tip of the finger;

the finger cap being disposed on the tip of the finger such that the second wire passes therethrough, and comprising a fourth wire tube having a U-shaped path intersecting with a U-shaped path of the first wire tube; and the finger strap comprising a fifth wire tube formed to extend in the extension direction of the finger segment and through which the second wire passes at the back of the finger.

4. The wearable hand robot of claim 2, wherein three finger caps and three finger members are provided and mounted on a thumb, an index finger and a middle finger of the user, respectively, and two first wires are provided, wherein one of the two first wires is installed to pass through the finger cap and the finger member mounted on the thumb and the other first wire is installed to pass through the finger caps and the finger members mounted on the index finger and middle finger, respectively.

5. The wearable hand robot of claim 1, wherein the bending unit of the finger member is flexibly formed such that interval between the finger straps adjacent to each other can be adjusted in accordance with a finger length of the user, or interval between the finger caps and the finger straps adjacent to each other can be adjusted.

* * * * *